Sept. 29, 1970 M. W. BANG 3,531,076

ELECTRICAL CONTROL DEVICE WITH CLIP ENGAGING MOUNTING BRACKET MEANS

Filed Aug. 6, 1968 2 Sheets-Sheet 1

INVENTOR.
MOGENS W. BANG
BY
Brown, Critchlow, Flick & Peckham
ATTORNEYS.

Sept. 29, 1970 M. W. BANG 3,531,076

ELECTRICAL CONTROL DEVICE WITH CLIP ENGAGING MOUNTING BRACKET MEANS

Filed Aug. 6, 1968 2 Sheets-Sheet 2

INVENTOR.
MOGENS W. BANG

BY

Brown, Critchlow, Flick & Peckham

ATTORNEYS.

United States Patent Office 3,531,076
Patented Sept. 29, 1970

3,531,076
ELECTRICAL CONTROL DEVICE WITH CLIP ENGAGING MOUNTING BRACKET MEANS

Mogens W. Bang, Ridgway, Pa., assignor to Stackpole Carbon Company, St. Marys, Pa., a corporation of Pennsylvania Filed Aug. 6, 1968, Ser. No. 750,738
Int. Cl. G12b *9/08*; H01c *1/02*
U.S. Cl. 248—316 4 Claims

ABSTRACT OF THE DISCLOSURE

A U-shaped spring clip is clamped onto the housing of an electrical control and is provided with a pair of spring tongues struck out of its back and extending rearwardly therefrom. The tongues are formed for gripping a support in order to mount the housing on the support. The support may be a bracket provided with anchor tabs for attachment to another support, such as a panel or printed circuit board.

Many electrical controls, such as rheostats, potentiometers and switches, are provided with terminals that are inserted in holes in printed circuit boards in order to electrically connect the controls with conductors on the boards. Sometimes the terminals also form a satisfactory mechanical connection between the controls and the boards, but in many cases it also is desirable to connect the controls to circuit boards or panels by separate fastening means in order to make the connection even more secure.

It is among the objects of this invention to provide an electrical control device which can be quickly and easily connected to a support in a very secure manner, which can be mounted upright or sideways on a support, and which can include a plurality of controls so that they can be handled as a unit.

The invention is illustrated in the accompanying drawings, in which

Figures 1, 2:
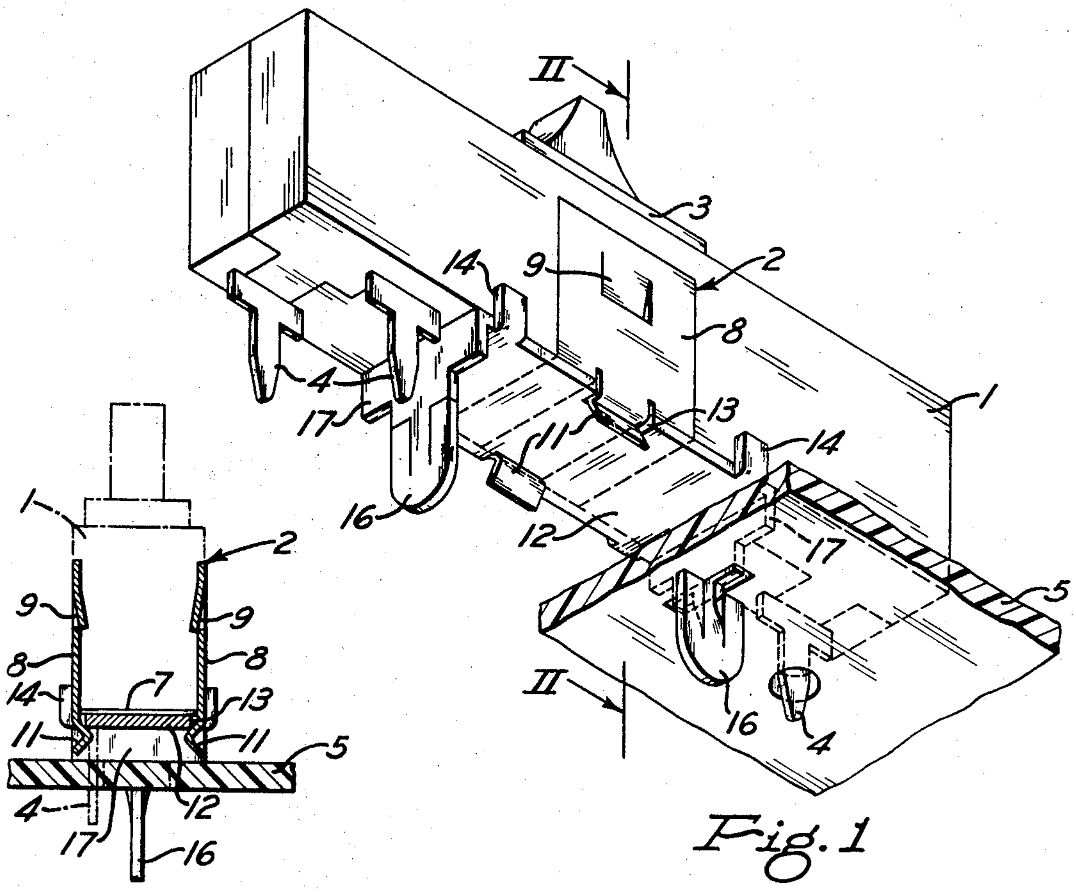
FIG. 1 is an isometric view of an electrical control device mounted on a printed circuit board shown fragmentarily.
FIG. 2 is a central cross section through the clip and bracket, taken on the line II—II of FIG. 1.

Referring to FIGS. 1 and 2 of the drawings, the long housing 1 of a potentiometer, for example, may be formed from a molded plastic or other suitable rigid material. This housing preferably is made from two molded half sections that have meeting edges extending from front to back of the housing and lengthwise along its back. The half sections are joined together in any suitable manner, such as by a spring clip 2 that will be described presently. The front of the housing is provided with a centrally located longitudinal slot, in which a slide 3 is slidably mounted. As is well known, the portion of the slide inside the housing carries a contact (not shown) that engages a collector strip and a resistance element. By moving the slide lengthwise of the housing, the resistance of the potentiometer can be varied. Projecting from the back of the housing are electric terminals 4 that are intended to be inserted in small openings in a printed circuit board 5.

The U-shaped spring clip 2 that is clamped onto the central portion of the housing is made from a strip of thin spring metal bent to provide it with a flat back 7 and forwardly extending sides 8. The back of the clip is flat against the back of the housing, and the sides of the clip press flat against the housing sides. To help hold the clip in position and also to prevent it from increasing the size of the central portion of the housing, the bottom and sides of the housing may be recessed to a depth equal to the thickness of the strip from which the clip is made. The outer surfaces of the clip then will be flush with the surrounding surfaces of the housing.

It also is desirable to form a positive lock between the clip and the housing. As shown, this can be done by striking rearwardly projecting locking tabs 9 inwardly out of the opposite sides of the clip so that in their unstressed positions they will converge rearwardly. The opposite sides of the housing are provided with depressions for receiving these tabs. The clip is forced onto the housing from the back, which causes the tabs to be sprung out into the sides of the clip until they reach and snap into the housing depressions and thereby prevent the clip from being pulled back off the housing.

It is a feature of this invention that means in addition to terminals 4 are provided for holding the potentiometer securely in place on the circuit board. This means includes clip 2, which is used even if the housing sections are held together in some other way, such as by rivets or an adhesive. Accordingly, a special feature of the spring clip is that it is provided with a pair of spring tongues 11 struck out of its back and extending rearwardly from it. The inner end of each tongue preferably is joined to the rear edge of the adjoining side of the clip, so that the tongues extend rearwardly from those sides. These spring tongues are formed for straddling and gripping a support. For this purpose, the tongues preferably are bent to form offset portions that extend toward each other for hooking over edge portions of a support between them. The most suitable support for the control housing is a bracket that has a flat plate-like body 12 engaging the back of the housing and gripped between the two spring tongues of the clip. To help hold the housing and bracket together, the opposite edges of the bracket body preferably are provided with recesses or notches 13, through which the spring tongues extend. To help prevent the housing from twisting on the bracket, the latter is provided with forward projections or ears 14 engaging the opposite sides of the housing.

This bracket can be firmly secured to a printed circuit board by means of anchor tabs 16 projecting rearwardly from opposite ends of the bracket. These tabs most suitably are of the well-known twist tab form, which are twisted after they pass through a circuit board so that they cannot be withdrawn. To permit the bracket to seat firmly on the board, without interference from spring tongues 11 on the clip, the end portions of bracket body 12 are turned back a distance at least as great as the distance that the spring tongues project from the body. The twist tabs extend away from the rear edges of these spaced shoulder 17, which seat on the circuit board. With such an arrangement, the bracket is plugged into the circuit board at the same time that the housing terminals are plugged in and then the anchor tabs 16 are twisted to hold everything in place.

Figure 3:
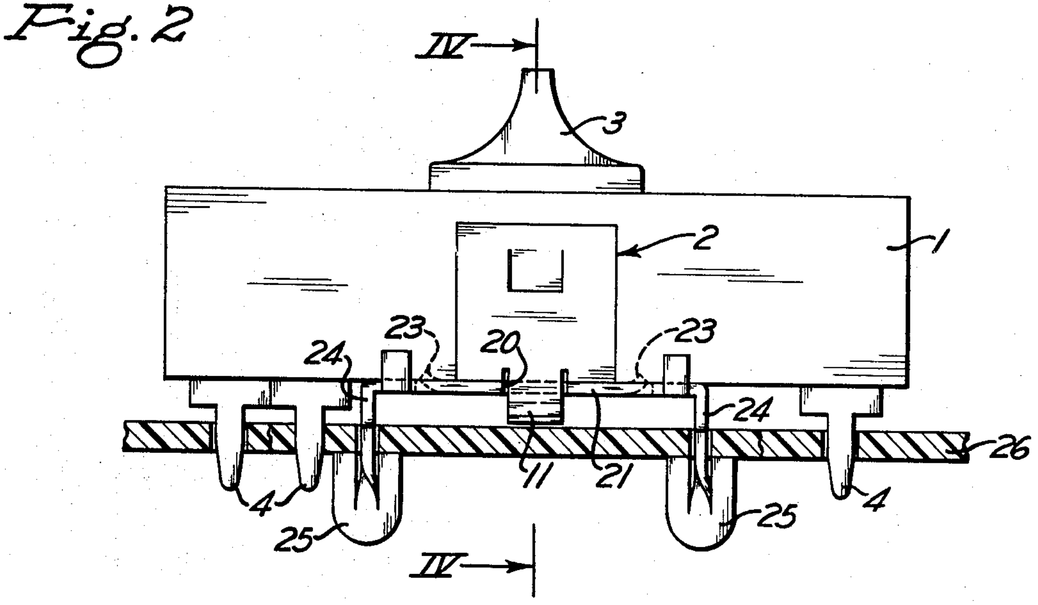
FIG. 3 is a side view of a modification.
Figure 4:
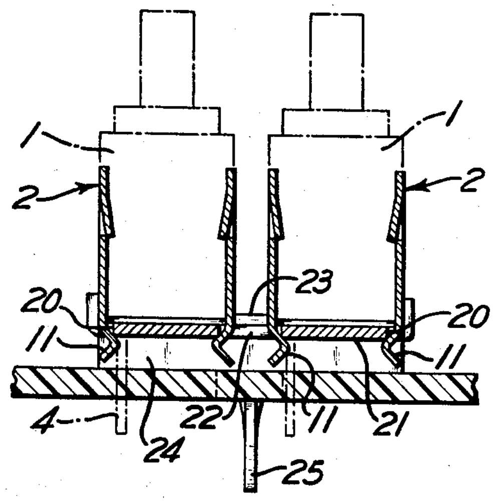
FIG. 4 is a cross section of the clip and bracket of FIG. 3, taken on the line IV—IV thereof.

In the modification shown in FIGS. 3 and 4, the bracket is wide enough to accommodate two control housings 1 placed side-by-side. The two outermost spring tongues 11 of the U-shaped clips 2 extend through notches 20 in the opposite edges of a flat bracket body 21, but the two innermost spring tongues extend down through an opening 22 in the central portion of the bracket body as shown in FIG. 4. In order to allow these inner tongues to spring side ways so that they can be inserted in the opening, there must be a little space between them, and that requires a little space between the housings. This space is assured by providing the bracket body with a pair of upstruck ears 23 that project up between the adjacent inner sides of the two housings and thereby positively hold them apart. The ends of the bracket body are turned back a short distance to provide spacing shoulders 24, and anchor tabs 25 extend rearwardly from the shoulders. Such a device is connected to a printed circuit board 26 in the same way as the first one described. It permits two, or even more, controls to be handled as a single unit and inserted in the circuit board simultaneously.

Figure 5:
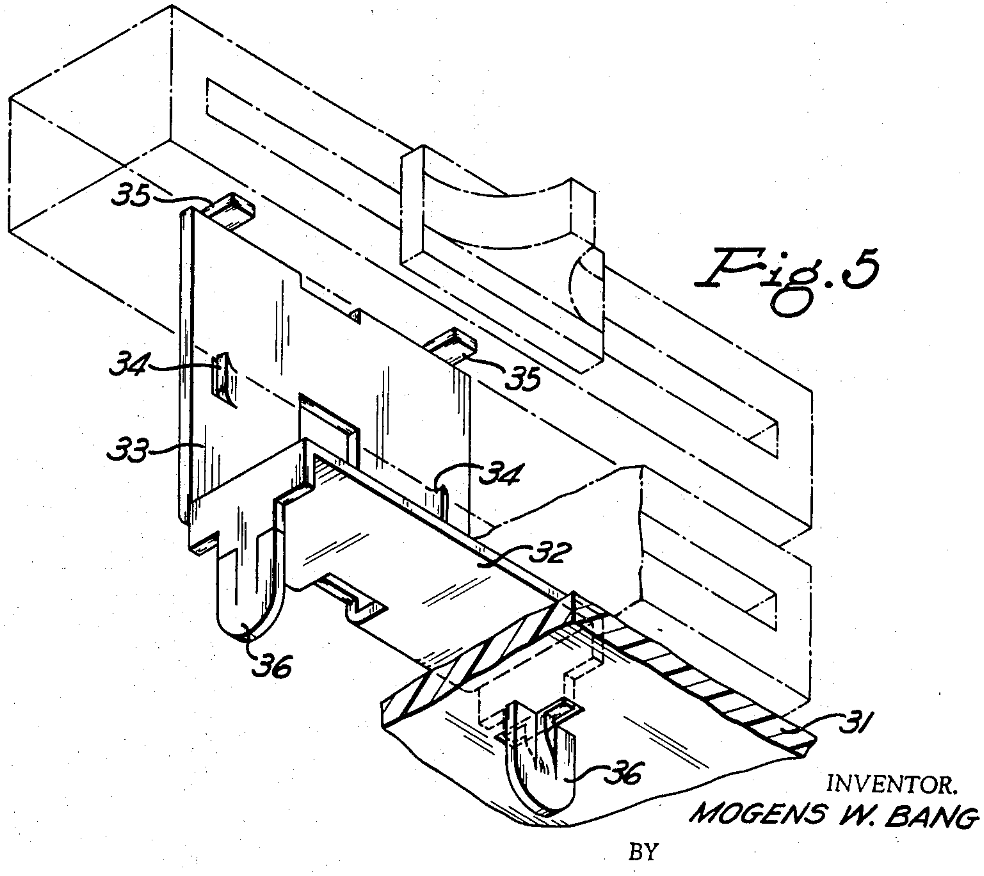
FIG. 5 is an isometric view of another form of bracket attached to a panel.

In a further embodiment of the invention shown in FIG. 5, an angular bracket is shown, by which one or more control housings can be secured to a panel 31, especially when a printed circuit board is not being used. In this form of bracket there is a plate-like member 32 integral with one edge of the bracket body 33 at right angles to member 32. Potentiometer housings are mounted on the bracket body in the same way as in FIGS. 3 and 4, between central ears 34 and side ears 35. Plate-like member 32 extends forward along the adjoining housing far enough to permit the ends of that member to be bent outwardly to form anchor tabs 36, which can be inserted in holes in the panel beside the unit.

The spring clips disclosed herein form ready means for snapping control housings onto brackets, and the brackets are adapted to quickly and securely attach the clips to a supporting panel.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An electrical control device comprising a housing having a back and a pair of substantially parallel sides, a U-shaped spring clip having a back and forwardly extending sides clamped onto said housing, the clip being provided with a pair of spring tongues struck out of said back and extending rearwardly therefrom, and a bracket having a plate-like body engaging the back of said housing and gripped between said spring tongues, said body having forward projections engaging the opposite sides of said housing, and said body also having anchor tabs at its ends projecting substantially perpendicularly from the body for attachment to a support.

2. An electrical control device comprising a housing having a back and a pair of substantially parallel sides, a U-shaped spring clip having a back and forwardly extending sides clamped onto said housing, the clip being provided with a pair of spring tongues struck out of said back and extending rearwardly therefrom, and a bracket having a plate-like body engaging the back of said housing and gripped between said spring tongues, said body having forward projections engaging the opposite sides of said housing, the projection at one side of said body being a plate-like member with anchor tabs projecting laterally away from its ends for attachment to a support.

3. An electrical control device comprising a pair of parallel housings each having a back and a pair of substantially parallel sides, a pair of U-shaped spring clips, each clip having a back and forwardly extending sides clamped onto one of said housings, each clip being provided with a pair of spring tongues struck out of its back and extending rearwardly therefrom, and a bracket having a plate-like body engaging the backs of both housings and provided with openings receiving the spring tongues of the clips, one of said openings being in the center of the bracket body for receiving one tongue of each clip, and the other openings for the other two spring tongues being notches in the edges of said body.

4. An electrical control device according to claim 3, in which said housings are spaced apart and said bracket body is provided with a pair of struck-out ears between the housings in engagement with their adjacent sides.

References Cited

UNITED STATES PATENTS

| | | | |
|---|---|---|---|
| 2,627,385 | 2/1953 | Tinnerman | 338—315 X |
| 3,362,004 | 1/1968 | Bang | 338—183 |
| 3,412,361 | 11/1968 | Lovejoy | 338—183 X |

LEWIS H. MYERS, Primary Examiner

G. P. TOLIN, Assistant Examiner

U.S. Cl. X.R.

248—27; 338—197, 317